US006341186B1

(12) United States Patent
Singh et al.

(10) Patent No.: US 6,341,186 B1
(45) Date of Patent: Jan. 22, 2002

(54) METHOD AND APPARATUS FOR THE PASSBAND FLATTENING OF DENSE WAVELENGTH DIVISION OPTICAL FILTERS

(75) Inventors: Harmeet Singh, Boca Raton; David Kirk Lewis, Delray Beach, both of FL (US)

(73) Assignee: Qtera Corporation, Boca Raton, FL (US)

( * ) Notice: Subject to any disclaimer, the term of this patent is extended or adjusted under 35 U.S.C. 154(b) by 0 days.

(21) Appl. No.: 09/290,775

(22) Filed: Apr. 13, 1999

(51) Int. Cl.$^7$ ............................................. G02B 6/293
(52) U.S. Cl. ............................ 385/27; 385/24; 359/127
(58) Field of Search ............................. 385/15, 24, 27, 385/39; 359/127

(56) References Cited

U.S. PATENT DOCUMENTS

| | | | | |
|---|---|---|---|---|
| 5,048,909 A | | 9/1991 | Henry | 385/27 |
| 5,050,954 A | * | 9/1991 | Gardner et al. | 385/16 |
| 5,459,801 A | | 10/1995 | Snitzer | 385/30 |
| 5,488,680 A | * | 1/1996 | Dragone | 385/24 |
| 5,633,965 A | | 5/1997 | Bricheno et al. | 385/37 |
| 5,636,309 A | | 6/1997 | Henry et al. | 385/129 |
| 5,647,037 A | | 7/1997 | Byron | 385/27 |
| 5,703,976 A | | 12/1997 | Cullen | 385/28 |
| 5,809,190 A | | 9/1998 | Chen | 385/43 |
| 5,926,587 A | * | 7/1999 | Chen et al. | 385/14 |
| 5,978,529 A | * | 11/1999 | Taga et al. | 385/24 |
| 5,999,290 A | * | 12/1999 | Li | 359/127 |

FOREIGN PATENT DOCUMENTS

EP 0778479 11/1997

OTHER PUBLICATIONS

Article entitled "Fused Coupler Technology for DWMD Applications", Gonthier, Fiber Optic Product News, Sep., 1998, pp. 54 and 56.
Article entitled "An NxN Optical Multiplexer Using a Planar Arrangement Of Two Couplers", by C. Dragone, IEEE Photonics Technology Letters, vol. 7, No. 9 Sep. 1991, pp. 812–815.

* cited by examiner

*Primary Examiner*—John D. Lee
*Assistant Examiner*—Sarah U. Song
(74) *Attorney, Agent, or Firm*—Hunton & Williams

(57) ABSTRACT

An optical flattening filter is cascaded with an optical filter between an input and an output of an optical arrangement to provide a substantially widened flat passband at an output of the optical arrangement. The optical filter is responsive to an input signal for generating a periodic or a periodic output response waveform having a cosine squared or Gaussian passband or any rounded passband shape. The optical flattening filter is designed to generate a response waveform having a spectral profile which is complementary to the periodic or aperiodic output response waveform of the optical filter. The interaction of the response waveforms of the optical filter and the optical flattening filter provide a resultant response waveform at the output of the optical arrangement wherein each peak therein is substantially flattened to provide a passband which is wider than the response waveform provided by the optical filter.

22 Claims, 5 Drawing Sheets

METHOD AND APPARATUS FOR THE PASSBAND FLATTENING OF DENSE WAVELENGTH DIVISION OPTICAL FILTERS

FIELD OF THE INVENTION

The present invention relates to method and apparatus for flattening the passband of optical Dense Wavelength Division Multiplexer (DWDM) or Demultiplexer devices having rounded passband shapes.

BACKGROUND OF THE INVENTION

The implementation of a low cost, low insertion loss optical Dense Wavelength Division Multiplexer (DWDM) or Demultiplexer is of great advantage in high capacity optical transmission system. Unfortunately, most high capacity DWDM devices have a high insertion loss or a high cost of manufacture associated with them. A design capable of accomplishing dense wavelength division multiplexing with low insertion loss is obtained by using an unbalanced Mach-Zehnder (UMZ) interferometer. However, UMZ filters suffer from a characteristic problem of a narrow pass bandwidth near the transmission peak. This narrow pass bandwidth near the peak is undesirable because it provides unwanted shaping of the signal. This problem is further exacerbated when a plurality of UMZs are cascaded in order to perform multiple channel demultiplexing or multiplexing.

U.S. Pat. No. 5,809,190 (Chen), issued on Sep. 15, 1998, discloses an unbalanced Mach-Zehnder (UMZ) interferometer capable of accomplishing dense wavelength division (DWD) multiplexing with low insertion loss. More particularly, Chen discloses apparatus and method of making a fused dense wavelength division multiplexer (DWDM) using a fused-biconical taper technique. The DWDM comprises multiple Multi-window Wavelength Division Multiplexers (MWDMs) which are cascaded in several stages where the MWDMs in each stage have an identical window spacing. For an N-channel DWDM, there are a predetermined plurality of DWDMs in each stage, and the stages are cascaded to form the MWDM. Unfortunately, the UMZ is by nature sensitive to temperature fluctuations of the environment, and typical temperature fluctuations expected in the terminal environment can render the DWDM device unusable. Therefore, the disclosed UMZ device is unstable because of the occurrence of variations in phase due to temperature fluctuations. A similar device is also discussed in an article titled "Fused-Coupler Technology for DWDM Applications" by F. Gonthier in the magazine *Fiber Optic Product News*, September 1998, at pages 54 and 56.

It is desirable to provide an optical filtering arrangement that is especially designed to flatten the passband of a unbalanced Mach-Zehnder filter. It is further desirable to provide an optical filtering arrangement that can be applied to enhance the passband flatness of any optical filter or DWDM arrangement with a rounded type of passband shape.

SUMMARY OF THE INVENTION

The present invention is directed to method and apparatus for flattening the passband of optical Dense Wavelength Division Multiplexer (DWDM) or Demultiplexer devices having rounded passband shapes.

Viewed from an apparatus aspect, the present invention is directed to an optical arrangement which comprises an optical filter and an optical flattening filter. The optical filter is responsive to an input signal for generating at an output thereof one of a group consisting of a periodic and a periodic output response waveform having a rounded passband shape. The optical flattening filter is coupled in cascade with the optical filter between an input and the output of the optical arrangement for generating a response waveform having a spectral profile which is complementary to the periodic or aperiodic output response waveform of the optical filter and interacts with the response waveform of the optical filter such that each peak in a resultant response waveform at the output of the optical arrangement is substantially flattened to provide a passband which is wider than the response waveform provided by the optical filter.

Viewed from a process aspect, the present invention is directed to a method of generating a substantially widened flat passband at an output of an optical arrangement. The method comprises a first step of generating, in response to an input signal to an optical filter, one of a group consisting of a periodic output response waveform and a aperiodic output response waveform having a rounded passband shape. The method further comprises a second step of generating a response waveform having a spectral profile which is complementary to the periodic or aperiodic output response waveform of the optical filter in an optical flattening filter coupled in cascade with the optical filter between an input and the output of the optical arrangement. The method further comprises a third step of generating a passband which is wider than the response waveform provided by the optical filter at the output of the optical arrangement by the interaction of the response waveforms of the optical filter obtained in the first step and the optical flattening filter obtained in the second step such that each peak in a resultant response waveform at the output of the optical arrangement is substantially flattened.

The invention will be better understood from the following more detailed description taken with the accompanying drawings and claims.

The drawings are not necessarily to scale.

DETAILED DESCRIPTION

Figure 1:
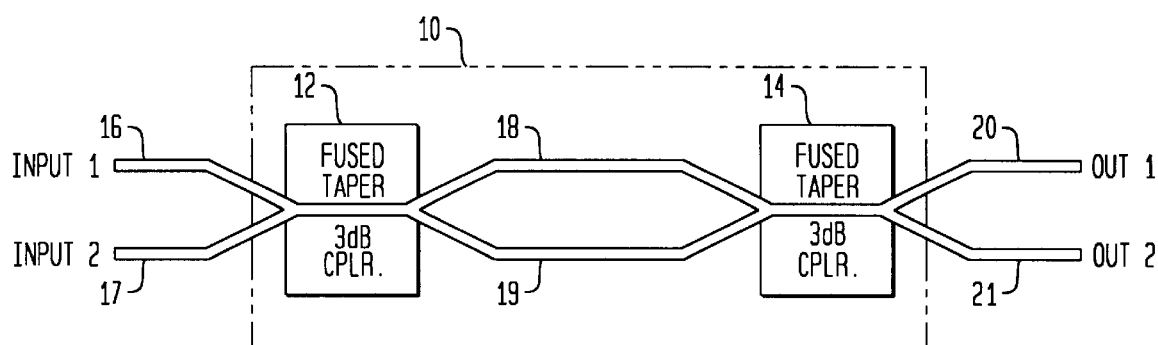
FIG. 1 shows a block diagram of a prior art unbalanced Mach-Zehnder interferometer.

Referring now to FIG. 1, there is shown a prior art unbalanced Mach-Zehnder multi-wavelength interferometer or filter 10 (shown within a dashed line rectangle) comprising first and second fused taper 3 dB couplers (CPLR.) 12 and 14. Each of the two fused taper couplers 12 and 14 is formed by, for example, heating two optical fibers (e.g., optical fibers 16 and 17) and fusing a section thereof together while tapering the fused section to a central point before dividing again. Alternatively, the fused tapered couplers 12 and 14 can be formed from planar waveguides to obtain a similar structure. The first fused taper coupler 12 is coupled to receive first and second optical input signals (INPUT 1 and 2) via optical fibers 16 and 17, respectively. After passing through the first fused taper coupler 12, the resultant combined first and second output signals are transmitted via first and second optical fibers 18 and 19, respectively, for providing respective first and second input signals at separate inputs of the second fused taper coupler 14. The optical path lengths of the optical fibers 18 and 19 have a predetermined difference and their lengths are hereinafter referred to as $L_{18}$ and $L_{19}$, respectively. After passing through the second fused taper coupler 14, the resultant combined signals are transmitted as first and second output signals (OUT 1 and 2) from the Mach-Zehnder interferometer 10 via first and second output optical fibers 20 and 21, respectively.

Based on the principles of interferometry, the transmission profiles "T" of the filter 10 in the first and second output optical fibers 20 and 21 are given by the equations:

$$T_{20}=\cos^2(\phi), \text{ and } T_{21}=\sin^2(\phi), \quad \text{(Eq. 1)}$$

$$\phi=2\pi n\delta L/w, \quad \text{(Eq. 2)}$$

where n is the refractive index of the interferometer medium, $\delta L$ is the relative path length difference ($\delta L=L_{19}-L_8$), and w is the wavelength of light.

Figure 2:
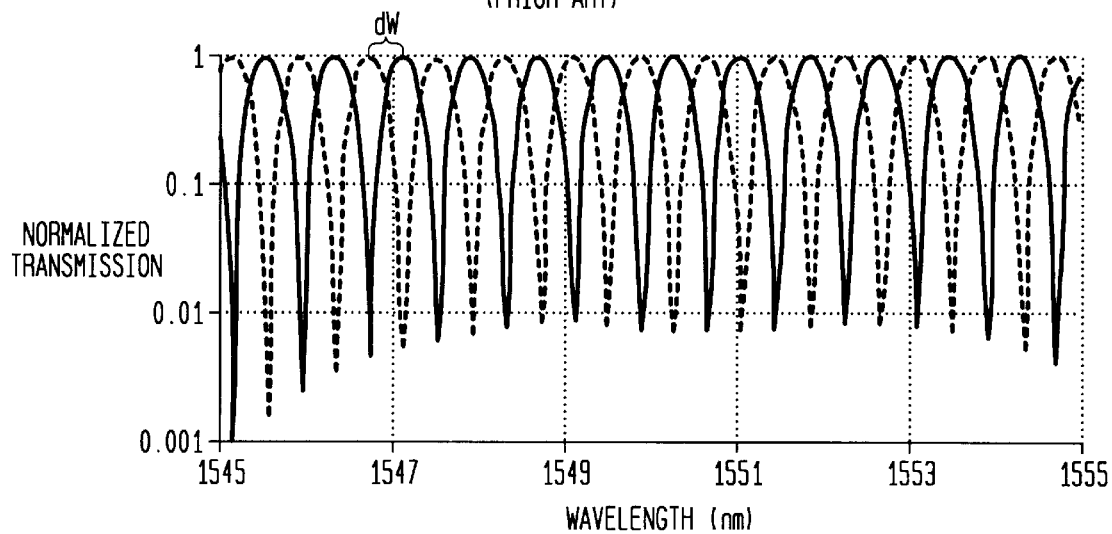
FIG. 2 graphically shows exemplary output waveforms that are obtainable from the prior art single stage Mach-Zehnder filter shown in FIG. 1.

Referring now to FIG. 2, there is graphically shown exemplary output waveforms obtained in the optical fibers 20 and 21 from the Mach-Zehnder multi-wavelength filter (interferometer) 10 of FIG. 1. The horizontal axis represents wavelength in nanometers (nm), and the vertical axis represents normalized transmission. The solid waveform represents the exemplary waveform obtained in the output optical fiber 20, and the dashed line waveform represents the exemplary waveform obtained in the output optical fiber 21. The waveforms for the optical fibers 20 and 21 are complementary to each other as is shown in Equation (1), and the peaks are separated by $\delta w$, where w is the wavelength of light and $\delta w$ is given by the equation $$\delta w=w^2/(2n\delta L). \quad \text{(Eq. 3)}$$

The filtering property of a Mach-Zehnder interferometer 10 can be exploited to separate densely packed signals at different wavelengths by cascading Mach-Zehnder interferometers with different $\delta w$'s.

Figure 3:
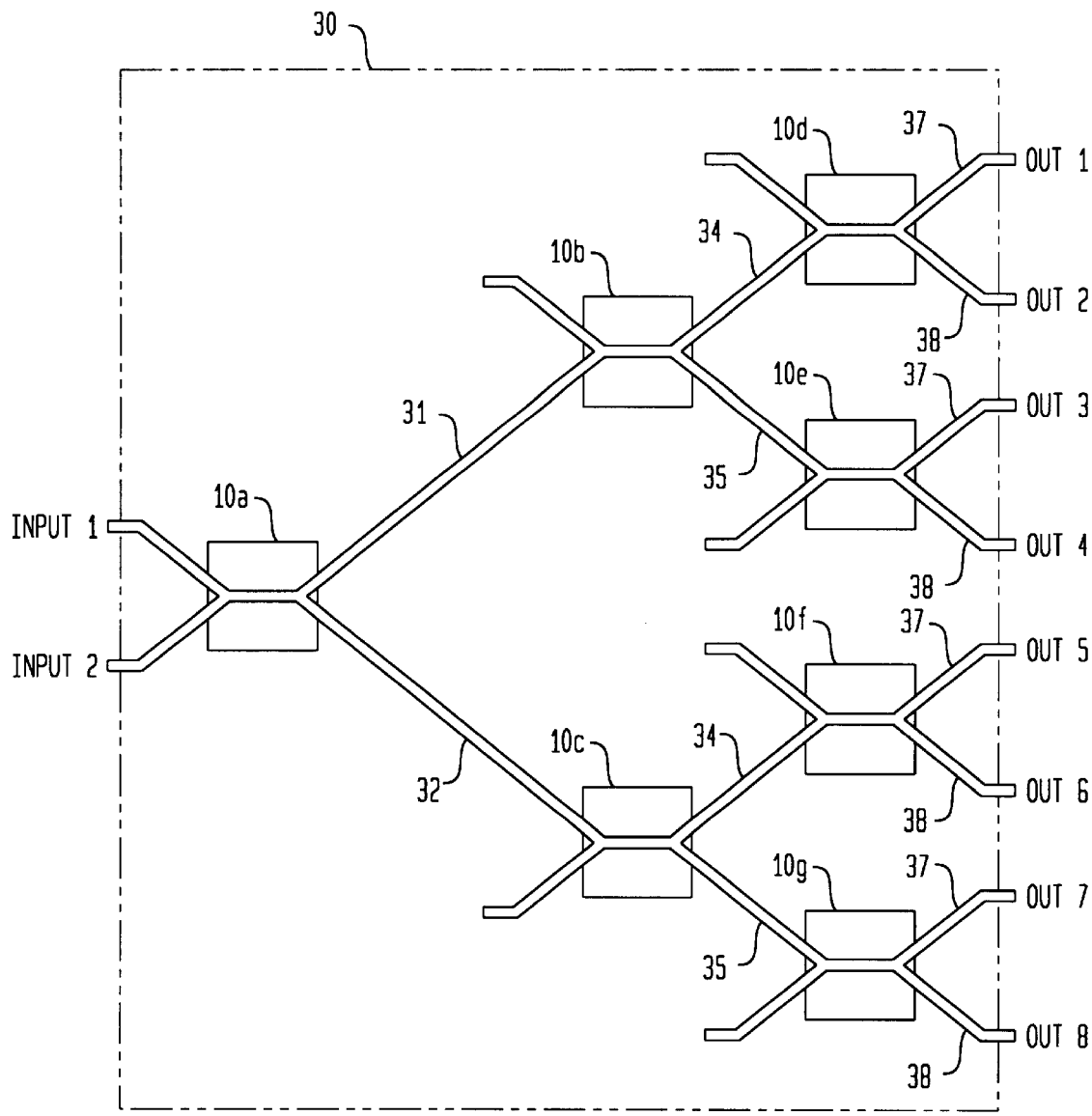
FIG. 3 shows a block diagram of a Dense Wavelength Division Multiplexer/Demultiplexer found in the prior art including cascaded Mach-Zehnders interferometers for separating eight signals received in a wavelength division multiplexed signal.

Referring now to FIG. 3, there is shown an exemplary Dense Wavelength Division Multiplexer (DWDM) or Demultiplexer 30 (shown within a dashed line rectangle) found in the prior art comprising a cascading of unbalanced Mach-Zehnder interferometers 10a–10g. A first stage of the cascaded arrangement comprises the Mach-Zehnder interferometer 10a which is capable of receiving first and second input signals and generate first and second output signals via optical waveguides 31 and 32, respectively. A second stage of the cascaded arrangement comprises the Mach-Zehnder interferometers 10b and 10c. The interferometer 10b is coupled to receive the first output from the interferometer 10a via the optical waveguide 31 at one of its two inputs with the other input being pigtailed (unused). The interferometer 10c is coupled to receive the second output from the interferometer 10a via the optical waveguide 32 at one of its two inputs with the other input being pigtailed (unused). A first output of the interferometer 10b is coupled to one of two inputs of the interferometer 10d via an optical waveguide 34 while a second output therefrom is coupled to one of two inputs of the interferometer 10e via an optical waveguide 35. The other input of the interferometers 10d and 10e are pigtailed (unused). Similarly, a first output of the interferometer 10c is coupled to one of two inputs of the interferometer 10f via an optical waveguide 34 while a second output therefrom is coupled to one of two inputs of the interferometer log via an optical waveguide 35. The other input of the interferometers 10f and 10g are pigtailed (unused). First and second outputs from each of the interferometers 10d, 10e, 10f, and 10g provide separate output channel signals from the DWD Demultiplexer arrangement 30. For multiplexing eight channel signals, the DWDM arrangement 30 would be used in a reverse direction with the eight channels signal being inputted at the right side (at OUT 1 to OUT 8) of FIG. 3 and a single wavelength division multiplexed signal being generated at one of the two outputs (at INPUT 1 or 2).

In the cascading arrangement of the unbalanced Mach-Zehnder interferometers 10a–10g, the $\delta w$ (delta wavelength) of each Mach-Zehnder interferometer in a stage is adjusted to be twice that of the Mach-Zehnder interferometer(s) in a previous stage.

Figure 4:
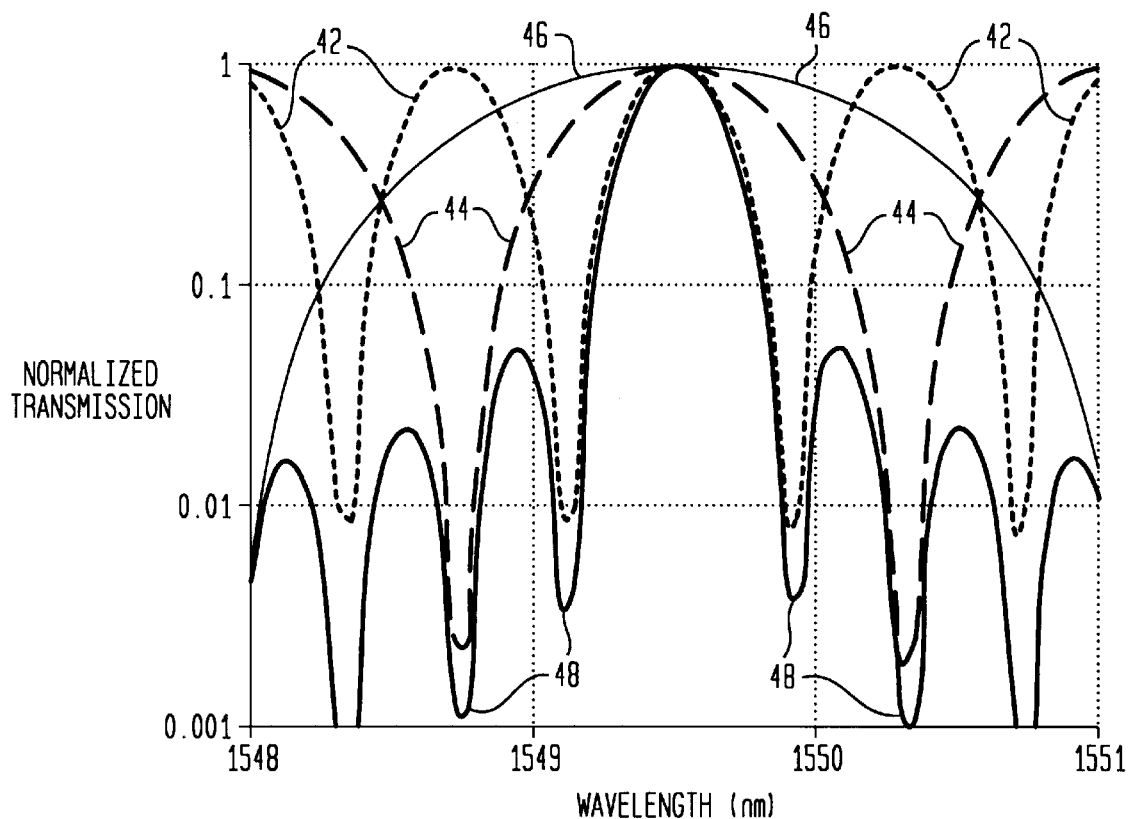
FIG. 4 graphically shows exemplary output waveforms having wavelengths between 1548 and 1551 nanometers that are obtainable from the prior art cascaded Mach-Zehnder interferometers shown in FIG. 3.

Referring now to FIG. 4, there is graphically shown enlarged exemplary output waveforms for one section of a frequency spectrum used with the prior art cascaded unbalanced Mach-Zehnder interferometers 10a–10g shown in FIG. 3. It is to be understood that the waveforms shown in FIG. 4 are essentially for one channel area and are repetitious in a corresponding manner below 1548 nm and above 1551 nm for the other channel areas. The horizontal axis represents wavelength in nanometers (nm) between 1548 and 1551 nanometers, and the vertical axis represents normalized transmission between 0.001 and 1. From the graphical display in FIG. 4, it can be seen that cascading three levels of unbalanced Mach-Zehnder interferometers 10a–10g (as is shown in FIG. 3) can allow for the separation of eight channels when demultiplexing an input DWD multiplexed signal. The dotted line waveform 42 is representative of an output on either leg 31 or 32 of the Mach-Zehnder interferometer 10a in the first stage of the DWD demultiplexer 30, where, for example, wavelengths 1,3,5,7 are found propagating in output leg 31 and wavelengths 2,4,6,8 are found propagating in output leg 32. The dashed line waveform 44 is representative of an output on any one of the output legs 34 or 35 from the Mach-Zehnder interferometers 10b and 10c in the second stage of the cascaded Mach-Zehnder interferometers 10a–10g. More particularly, the wavelengths 1 and 5 are found propagating in output leg 34 of interferometer 10b, wavelengths 3 and 7 are found propagating in output leg 35 of interferometer 10b, the wavelengths 2 and 6 are found propagating in output leg 34 of interferometer 10c, wavelengths 4 and 8 are found propagating in output leg 35 of interferometer 10c. The solid line waveform 46 is generally representative of an output on any one of the output legs 37 or 38 from the Mach-Zehnder interferometers 10d, 10e, 10f, or 10g in the third stage of the cascaded Mach-Zehnder interferometers 10a–10g. The bold solid line waveform 48 is representative in greater detail, of an output on either leg 37 or 38 from the Mach-Zehnder interferometers 10d, 10e, 10f, or 10g in the third stage of the cascaded Mach-Zehnder interferometers 10a–10g. As was stated hereinabove, the waveforms shown in FIG. 4 are repetitious in a corresponding manner below 1548 nm and above 1551 nm so that the peak of the bold line waveform 48 corresponds to only one of the outputs from one of the Mach-Zehnder interferometers 10d, 10e, 10f, or 10g. Each of the remaining outputs from the Mach-Zehnder interferometers 10d, 10e, 10f, or log has a peak at a different wavelength such that a separate demultiplexed channel of a received eight-channel multiplexed signal is obtained at each output (OUT 1-OUT 8) from the cascaded unbalanced Mach-Zehnders 10a–10g in the DWDM 30. If, for example, it is assumed that wavelengths of channels 1, 3, 5, and 7 are found propagating in output leg 31 of interferometer 10a, and wavelengths of channels 2, 4, 6, and 8 are found propagating in output leg 32 of interferometer 10a, then the first and second outputs via optical waveguides 37 and 38 from interferometer 10d are the demultiplexed channel 1 and 3 signals, respectively. Similarly, the first and second outputs via optical waveguides 37 and 38 from interferometer 10e are the demultiplexed channel 5 and 7 signals, respectively, the first and second outputs via optical waveguides 37 and 38 from interferometer 10f are the demultiplexed channel 2 and 4 signals, respectively, and the first and second outputs via optical waveguides 37 and 38 from interferometer 10g are the demultiplexed channel 6 and 8 signals, respectively. The cascade unbalanced Mach-Zehnder arrangement as is shown in FIG. 3 is suggested in U.S. Pat. No. 5,809,190 (Chen), issued on Sep. 15, 1998.

Figure 5:
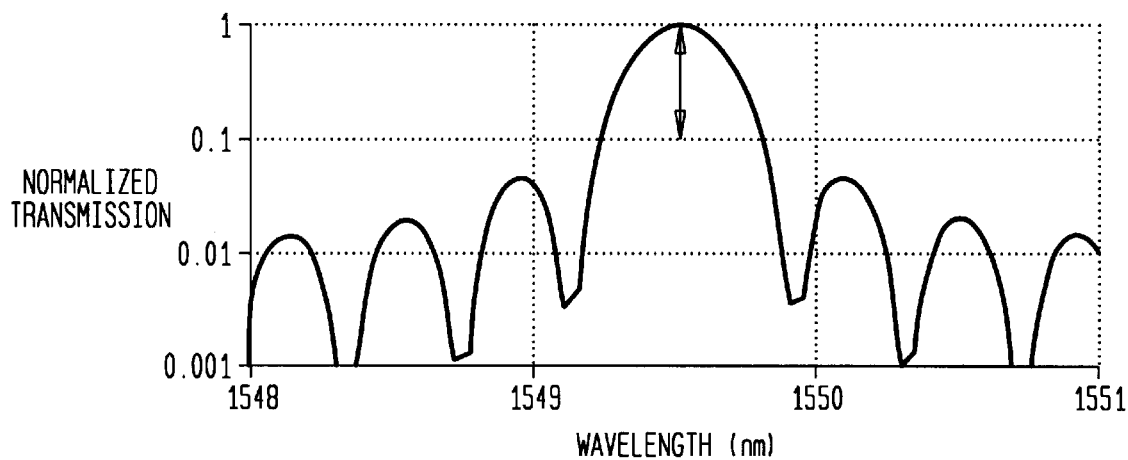
FIG. 5 graphically shows an exemplary output waveforms that are obtainable for one channel from the prior art cascaded Mach-Zehnder interferometers shown in FIG. 3.

Referring now to FIG. 5, there is shown the results of a numerical modeling of unbalanced Mach-Zehnders 10a–10g cascaded as is shown in FIG. 3 to illustrate an extraction of a single channel shown by the solid line waveform from an output leg of an eight channel device (seven cascaded unbalanced Mach-Zehnders 10a–10g). The horizontal axis represents wavelength in nanometers (nm) between 1548 and 1551 nanometers, and the vertical axis represents normalized transmission between 0.001 and 1.

From the waveforms shown in FIGS. 2, 4 and 5, it can be seen that the prior art arrangements 10 and 30 of FIGS. 1 and 3, respectively, have a characteristic problem of a narrow transmission bandwidth near the rounded transmission peak. Such narrow pass bandwidth near the rounded peak is undesirable because it provides unwanted shaping to the optical signal.

Figure 6:
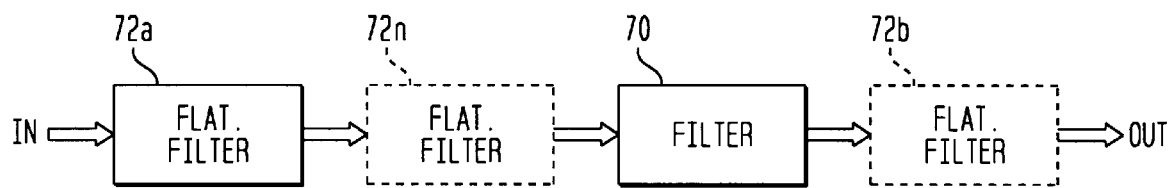
FIG. 6 shows an arrangement of a periodic or aperiodic filter in cascade with a flattening filter and one or more optional flattening filters in accordance with the present invention.

Referring now to FIG. 6, there is shown an arrangement of a periodic or aperiodic filter 70 in cascade with a flattening filter 72a, and optionally with additional one or more flattening filters 72b and 72n (shown in dashed lined rectangles) in accordance with the present invention. A periodic filter 70 is defined as having an output response that includes equally spaced periodic peaks as shown, for example, in FIG. 2, whereas an aperiodic filter 70 has an output response (not shown) that includes only one or two spaced-apart peaks. The filter 70 to be flattened can comprise a 1×N Multiplexer or Demultiplexer as is shown, for example, in FIGS. 1 and 3 or any other suitable device. In accordance with the present invention, the filter 70 prefer-ably has a cosine squared or Gaussian passband having rounded peaks, and the flattening filter 72a is arranged to have a response that is substantially complementary to the response curve of the filter 70 while maintaining a minimal insertion loss. The flattening filter 72a can be optionally located in an optical path either prior to the filter 70 as is shown in FIG. 6, or after the filter 70 as is shown by the flattening filter 72b. Still further, in accordance with the present invention, a plurality of flattening filters with different periodicities can be cascaded in the optical path of the filter 70 as shown by the flattening filters 72a and 72n, where flattening filter 72n can comprise one or more cascaded flattening filters with different periodicities. For example, the flattening filter 72a can have the periodicity that is the same as the periodicity of the filter 70, the first flattening filter 72n can have a periodicity that is two times that of filter 70, and a second flattening filter (not shown but like filter 72n and cascaded after the first filter 72n) can have a periodicity that is four times that of filter 70. Such cascading of two or more flattening filters (72a and 72n) is equivalent to building a Fourier series with different flattening filters 72. It is preferred, but not mandatory, that when a plurality of flattening filters 72a and 72n are used to build a Fourier series, that the flattening filters 72a and 72n be located on the same side of the filter 70 to be flattened.

Figure 7:
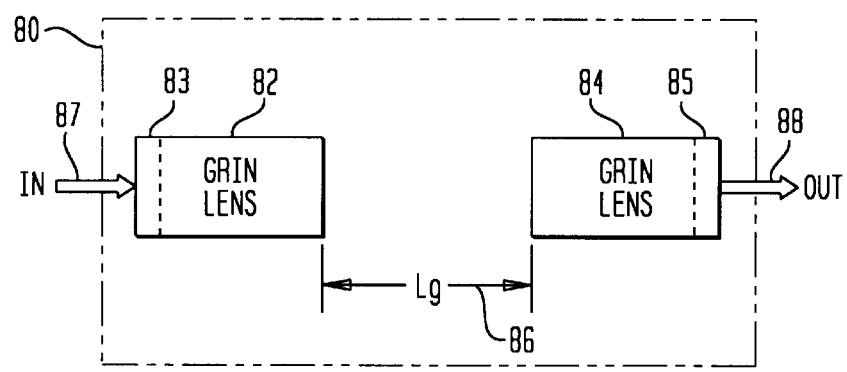
FIG. 7 shows an arrangement of a flattening low Finesse Fabry-Perot filter for use as a flattening filter in the arrangement of FIG. 6 in accordance with a first embodiment of the present invention.

Referring now to FIG. 7, there is shown an arrangement of a flattening low Finesse Fabry-Perot interferometer or filter 80 (shown within a dashed line rectangle) for use as a flattening filter 72a, 72b, or 72n in the arrangement of FIG. 6 in accordance with a first embodiment of the present invention. The filter 80 comprises a first and second optical fiber 87 and 88 that are terminated with a first and second GRIN lens 82 and 84, respectively. The first and second GRIN lenses 82 and 84 have a finite predetermined cavity spacing (Lg) 86 therebetween that has optical path differences designed to yield a free spectral range equal to, or a multiple of, the filter 70 of FIG. 6 to have its response flattened. For example, to flatten a Mach-Zehnder filter 70 (of the type shown in FIG. 1) with a 100 GHz free spectral range, a cavity spacing 86 of approximately 1.5 millimeters would be needed. Still further, end faces 83 and 85 of the GRIN lenses 82 and 85, respectively, are not coated with an anti-reflection (AR) coating, but are coated with a film that provides a certain coefficient of reflectivity (r). The transmission of the filter 80 is described by the following equation:

$$T = \frac{1}{1 + F[\sin^2(2\pi \cdot Ng \cdot Lg/w)]} \quad \text{(Eq. 4)}$$

where $F=4r^2/(1-r^2)^2$, r is the reflection coefficient, Ng is the index of refraction of the medium in the cavity 86 between the GRIN lenses 82 and 84, Lg is the length of the cavity 86 between the GRIN lenses, and w is the optical wavelength of the signal. The low finesse Fabry-Perot filter 80 has the advantage that, in transmission, the response peaks have zero loss while the minima have non-zero transmission.

Figure 8:
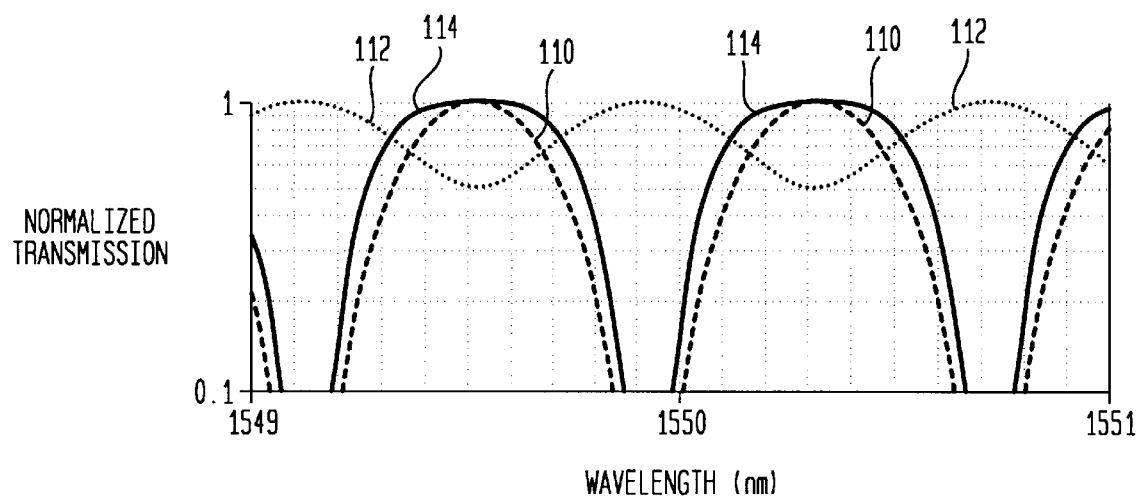
FIG. 8 graphically shows exemplary output response waveforms that are obtainable for a Mach-Zehnder filter to be flattened, a flattening filter, and a flattened Mach-Zehnder filter.

Referring now to FIG. 8, there is graphically shown exemplary output response waveforms 110, 112, and 114 that are obtainable for a Mach-Zehnder (MZ) filter 70 of FIG. 6 to be flattened, a flattening filter 80 of FIG. 7, and a flattened Mach-Zehnder filter 70 produced by the cascading of the filters 70 and 80, respectively. The horizontal axis represents wavelength in nanometers (nm) and the vertical axis represents normalized transmission between 0.1 and 1. More particularly, the exemplary dashed line response waveform 110 is for the MZ filter 70 to be flattened, the exemplary dotted line response waveform 112 is for the flattening filter 80, and the exemplary bold line waveform 114 is for the resultant flattened response of the MZ filter 70. As can be observed from FIG. 8, for an exemplary 100 GHz Fabry-Perot filter 80, the total bandwidth at a normalized transmission value of 0.5dB below the peak between waveforms 110 and 114 is almost doubled from 0.17 nm to 0.3 nm. Such enhancement has a significant impact on optical transmission systems because high capacity signals can now be transmitted without any signal deterioration or biasing. In principle, a classical MZ filter 70 has a peak response at a normalized transmission value of 1, and the response drops down from the peak very sharply. Depending on the how deep the drop goes (where the curve dies out), the ratio of the maximum to the minimum is called an Extinction ratio. The flattening filter 80 (or 72a) has a response that is substantially complementary to that of the filter 70 to be flattened, but the flattening filter is designed to not have an extinction ratio that is equal to that of the filter 70 to be flattened. In FIG. 8 the response curve 112 of the flattening filter 80 is at a maximum value at 1 and at a minimum value at 0.5 for an extinction ratio which is different from the response curve 110 of the filter 70 where the maximum value is at 1 and the minimum value is less than 0.1. Therefore, in accordance with the present invention, the flattening filter 80 has a reduced extinction ratio and a complementary response to that of the filter 70 to be flattened. The extinction ratio can be reduced by experimentation or design to a point where a desired flat passband results with a minimal predetermined amount of insertion loss.

Where a plurality of, for example, two flattening filters 72a and 72n of FIG. 6 are used, the flattening filter 72a would have a response shown for waveform 112, and the flattening filter 72n might have a response (not shown) with a corresponding extinction ratio similar to that of filter 72a but with a frequency which is, for example, twice that of the flattening filter 72a. Under such flattening filter arrangement, the flattening filter 72a will produce a flattened response as shown for waveform 114 and the flattening filter would affect the flattened waveform 114 to further increase the bandwidth at the peak and add some slight ripple in the increased flattened pass bandwidth. The addition of second and third flattening filters 72n (not shown) in cascade with the first flattening filter 72n but with different periodicities would further widen the passband of response curve 114 and tend to reduce the amount of ripple caused by the first flattening filter 72n. Effectively, the flattening filters 72a and first to third flattening filters 72n with different periodicities builds a Fourier series to flatten the response of the filter 70.

Figure 9:
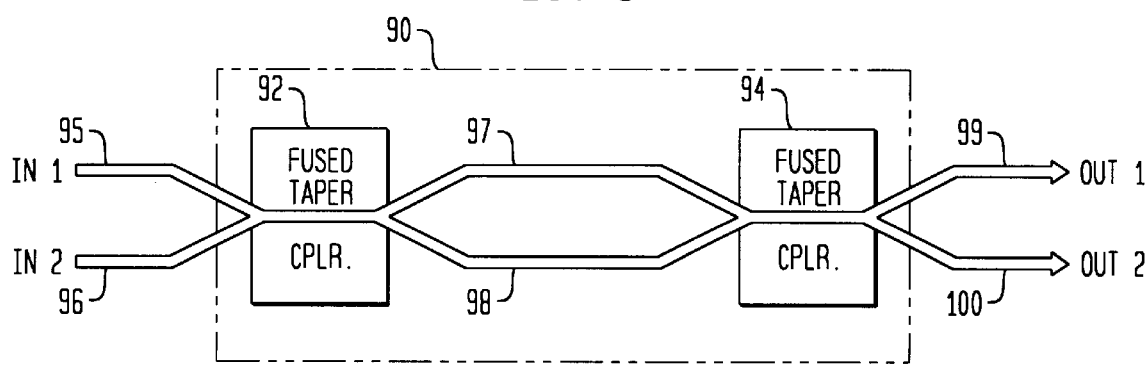
FIG. 9 shows an arrangement of flattening Mach-Zehnder filter for use as a flattening filter in the arrangement of FIG. 6 in accordance with a second embodiment of the present invention.

Referring now to FIG. 9, there is shown an arrangement of flattening Mach-Zehnder (MZ) filter 90 for use as a flattening filter 72a in the arrangement of FIG. 6 in accordance with a second embodiment of the present invention. The flattening MZ filter 90 comprises first and second fused tapered couplers 92 and 94 which are interconnected by parallel optical paths 97 and 98 of predetermined different path lengths. The flattening MZ filter 90 has a similar structure and operation to that of the prior art unbalanced MZ filter 10 of FIG. 1 discussed hereinbefore, but with certain differences. The MZ filter 90 is constructed with a low contrast ratio using two design rules of (1) selecting splitting ratios of the first and second couplers 92 and 94, at optimized values for the contrast ratio, to result in an appropriate flattening of the response of the filter 70, and (2) choosing a path length imbalance between the optical paths 97 and 98 to match the periodicity of the filter 70 that needs to be flattened. More particularly, for a typical Mach-Zehnder filter 70, the splitting ratios of the two fused tapered couplers 12 and 14 (shown in FIG. 1) are 50:50 whereby full contrast is obtained in which the fringes of the response curve go all the way to down to a 0 normalized transmission. This is the equivalent of the response curve of FIG. 2 going in a negative direction all the way down to 0 normalized transmission. By changing the splitting ratio so that each of the couplers 92 and 94 have a splitting ratio of, for example, 05:95, the resultant response waveform will have a lower extinction ratio as shown for example by waveform 112 in FIG. 8. The transmission of such flattening MZ filter 90 is described by the following equation:

$$T = 2 \cdot (\alpha - \alpha^2) \cdot [1 + \cos(Lf \cdot Nf \cdot 2\pi/w)], \ 0 < \alpha < 1 \quad \text{(Eq. 5)}$$

where α is the splitting ratio of the two couplers 92 and 94 (assumed to be equal), Nf is the index of refraction of the optical fiber 97 and 98, Lf is the path length difference between the two paths 97 and 98, and w is the optical wavelength of the signal.

While both a Fabry-Perot filter 80 and a Mach-Zehnder (MZ) filter 90 are appropriate for flattening applications, in many cases the MZ filter 90 is preferred because of the lower insertion loss and higher stability (using passive and active techniques).

The flattening filters 72a, 72b, and 72n are suitable for use with optical Dense Wavelength Division Multiplexer (DWDM) or Demultiplexer devices having rounded passband shapes where a wide passband is required either due to a large information bandwidth or large laser drift due to aging, etc. Still further, the invention described hereinbefore is simple and independent of the device to be flattened, and is capable of flattening the response of units already installed in the field simply by introducing the flattening filter 72 in the optical path before or after the unit to be flattened. Additionally, the flattening filter 72a, 72b, or 72n can be used to flatten the response of an Arrayed Waveguide (AWG) device such as disclosed in the article "An N×N Optical Multiplexer Using a Planar Arrangement of Two Star Couplers" by C. Dragone, *IEEE Photonics Technology Letters*, Vol. 7, No. 9, September 1991, at pages 812–815. An AWG is basically a silicon or silica chip having a planar waveguide with multiple paths wherein an incoming signal is split up and the split signals go through all of the paths. When properly designed, each output leg of an AWG has an output wavelength that is different from each of the other output legs.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. An optical arrangement comprising:
   an optical filter responsive to an input signal for generating at an output thereof one of a group consisting of a periodic and aperiodic output response waveform having a rounded passband shape; and
   an optical flattening filter coupled in cascade with the optical filter between an input and an output of the optical arrangement for generating a response waveform having a spectral profile which is complementary to the periodic or aperiodic output response waveform of the optical filter and interacts with the response waveform of the optical filter such that each peak in a resultant response waveform at the output of the optical arrangement is substantially flattened to provide a passband which is wider than the response waveform provided by the optical filter, wherein the optical filter comprises one of an optical multiplexer and an optical demultiplexer, wherein the optical flattening filter is a Fabry-Perot filter comprising first and second GRIN lenses terminating first and second optical fibers, respectively, wherein the ends of the first and second GRIN lenses opposite the terminated optical fibers are separated by a cavity of a predetermined length such that the Fabry-Perot filter generates a response waveform having a spectral profile which is complementary to the response waveform of the optical filter.

2. The optical arrangement of claim 1 wherein:

the flattening filter generates a response waveform that has a spectral profile which is complementary to, and has a periodicity equal to, the response waveform of the optical filter; and the optical arrangement further comprises at least a second optical flattening filter wherein the second flattening filter generates a response waveform that has a spectral profile which has a periodicity which is an integer multiple of the response waveform of the optical filter.

3. The optical arrangement of clam 1 wherein the group consisting of a periodic and aperiodic output response waveform having a rounded passband shape comprises a cosine squared passband shap and Gaussian passband shape.

4. The optical arrangement of claim 1 wherein the output response waveform generated by the optical filter represents a channel signal including unwanted signal shaping, and wherein the optical flattening filter removes the unwanted signal shaping.

5. The optical arrangement of claim 1 wherein the output response waveform generated by the optical filter includes a rounded transmission peak, and the response waveform generated by the optical flattening filter has a spectral profile which is complementary to the rounded transmission peak.

6. The optical arrangement of claim 1 wherein the output response waveform generated by the optical filter includes a rounded transmission peak, and the optical flattening filter serves to flatten the rounded transmission peak.

7. A method of generating a wide flat passband at an output of an optical arrangement comprising the steps of:

(a) generating, in response to an input signal to an optical filter, one of a group consisting of a periodic output response waveform and aperiodic output response waveform having a rounded passband shape;

(b) generating a response waveform having a spectral profile which is complementary to the periodic or aperiodic output response waveform of the optical filter in an optical flattening filter coupled in cascade with the optical filter between an input and the output of the optical arrangement; and (c) generating a passband which is wider than the response waveform provided by the optical filter at the output of the optical arrangement by the interaction of the response waveforms of the optical filter obtained in step (a) and of the optical flattening filter obtained in step (b) such that each peak in a resultant response waveform at the output of the optical arrangement is substantially flattened, wherein the optical filter comprises one of an optical multiplexer and an optical demultiplexer, wherein in performing step (b), generating a response waveform having a spectral profile which is complementary to the periodic or aperiodic output response waveform of the optical filter in an optical flattening filter which is a Fabry-Perot filter comprising first and second GRIN lenses having a cavity therebetween with a predetermined length.

8. The method of claim 7 comprising the further steps of:

(d) in performing step (b), generating a response waveform that has a spectral profile which is complementary to, and has a periodicity equal to, the response waveform of the optical filter in the flattening filter; and (e) prior to performing step (c), generating a response waveform that has a spectral profile which has a periodicity which is an interger multiple of the response waveform of the optical filter in at least a second optical flattening filter.

9. The method of claim 7 wherein in performing step (a), the group consisting of a periodic and aperiodic output response waveform having a rounded shape comprises a cosine squared passband shape and a Guassian passband shape.

10. The method of claim 7 wherein the output response waveform generated by the optical filter represents a channel signal including unwanted signal shaping, and wherein the optical flattening filter removes the unwanted signal shaping.

11. The method of claim 7 wherein the output response waveform generated by the optical filter includes a rounded transmission peak, and the response waveform generated by the optical flattening filter has a spectral profile which is complementary to the rounded transmission peak.

12. The method of claim 7 wherein the output response waveform produced by the optical filter includes a rounded transmission peak, and the optical flattening filter serves to flatten the rounded transmission peak.

13. An optical arrangement comprising:

an optical filter responsive to an input signal for generating at an output thereof one of a group consisting of a periodic and aperiodic output response waveform having a rounded passband shape; and an optical flattening filter coupled in cascade with the optical filter between an input and an output of the optical arrangement for generating a response waveform having a spectral profile which is complementary to the periodic or aperiodic output response waveform of the optical filter and interacts with the response waveform of the optical filter such that each peak in a resultant response waveform at the output of the optical arrangement is substantially flattened to provide a passband which is wider than the response waveform provided by the optical filter, wherein the optical flattening filter is a Mach-Zehnder interferometer comprising first and second fused tapered couplers having a predetermined splitting ratio, each fused tapered coupler being responsive to the reception of an optical input signal for generating separate predetermined first and second optical output signals, wherein the first and second output signals from the first fused tapered coupler are coupled via first and second optical waveguides having separate predetermined lengths to first and second optical inputs, respectively, of the second fused tapered coupler, and a first output signal from the second fused tapered coupler has a spectral profile which is complementary to the response waveform of the optical filter.

14. The optical arrangement of claim 13 wherein the transmission characteristics of the Mach-Zehnder interferometer is defined by $$T = 2 \cdot (\alpha - \alpha^2) \cdot [1 + \cos(Lf \cdot Nf \cdot 2\pi/w)], \ 0 < \alpha < 1,$$

where $\alpha$ is a splitting ratio of the first and second fused tapered couplers, Nf is an index of refraction of the first and second optical waveguides, Lf is a path length difference between the first and second optical waveguides, and w is an optical wavelength of the signal.

15. A method of generating a wide flat passband at an output of an optical arrangement comprising the steps of:
    (a) generating, in response to an input signal to an optical filter, one of a group consisting of a periodic output response waveform and aperiodic output response waveform having a rounded passband shape;
    (b) generating a response waveform having a spectral profile which is complementary to the periodic or aperiodic output response waveform of the optical filter in an optical flattening filter coupled in cascade with the optical filter between an input and the output of the optical arrangement; and
    (c) generating a passband which is wider than the response waveform provided by the optical filter at the output of the optical arrangement by the interaction of the response waveforms of the optical filter obtained in step (a) and of the optical flattening filter obtained in step (b) such that each peak in a resultant response waveform at the output of the optical arrangement is substantially flattened,
        wherein in performing step (b), generating a response waveform having a spectral profile which is complementary to the periodic or aperiodic output response waveform of the optical filter in an optical flattening filter which is Mach-Zehnder interferometer comprising first and second fused tapered couplers having a predetermined splitting ratio.

16. The method of claim 15 wherein the transmission characteristics of the Mach-Zehnder interferometer is defined by $$T = 2 \cdot (\alpha - \alpha^2) \cdot [1 + \cos(Lf \cdot Nf \cdot 2\pi/w)], \ 0 < \alpha < 1,$$

where $\alpha$ is the splitting ratio of first and second fused tapered couplers of the Mach-Zehnder interferometer, Nf is an index of refraction of first and second optical waveguides interconnecting the first and second fused tapered couplers in the Mach-Zehnder interferometer, Lf is a path length difference between the first and second optical waveguides, and w is an optical wavelength of the input signal.

17. An optical arrangement comprising:
    an optical filter responsive to an input signal for generating at an output thereof one of a group consisting of a periodic and aperiodic output response waveform having a rounded passband shape; and
    an optical flattening filter coupled in cascade with the optical filter between an input and an output of the optical arrangement for generating a response waveform having a spectral profile which is complementary to the periodic or aperiodic output response waveform of the optical filter and interacts with the response waveform of the optical filter such that each peak in a resultant response waveform at the output of the optical arrangement is substantially flattened to provide a passband which is wider than the response waveform provided by the optical filter,
    wherein the optical flattening filter is a Fabry-Perot filter comprising first and second GRIN lenses terminating first and second optical fibers, respectively, wherein the ends of the first and second GRIN lenses opposite the terminated optical fibers are separated by a cavity of a predetermined length such that the Fabry-Perot filter generates a response waveform having a spectral profile which is complementary to the response waveform of the optical filter,
    wherein the transmission characteristics of the Fabry-Perot filter is defined by $$T = \frac{1}{1 + F[\sin^2(2\pi \cdot Ng \cdot Lg/w)]},$$

where $F = 4r^2/(1-r^2)^2$, r is a reflection coefficient, Ng is an index of refraction of a medium existing in the cavity between the GRIN lenses, Lg is a length of the cavity between the GRIN lenses, and w is an optical wavelength of the signal.

18. A method of generating a wide flat passband at an output of an optical arrangement comprising the steps of:
    (a) generating, in response to an input signal to an optical filter, one of a group consisting of a periodic output response waveform and aperiodic output response waveform having a rounded passband shape;
    (b) generating a response waveform having a spectral profile which is complementary to the periodic or aperiodic output response waveform of the optical filter in an optical flattening filter coupled in cascade with the optical filter between an input and the output of the optical arrangement; and
    (c) generating a passband which is wider than the response waveform provided by the optical filter at the output of the optical arrangement by the interaction of the response waveforms of the optical filter obtained in step (a) and of the optical flattening filter obtained in step (b) such that each peak in a resultant response waveform at the output of the optical arrangement is substantially flattened,
        wherein in performing step (b), generating a response waveform having a spectral profile which is complementary to the periodic or aperiodic output response waveform of the optical filter in an optical flattening filter which is a Fabry-Perot filter comprising first and second GRIN lenses having a cavity therebetween with a predetermined length,
    wherein the transmission characteristics of the Fabry-Perot filter is defined by $$T = \frac{1}{1 + F[\sin^2(2\pi \cdot Ng \cdot Lg/w)]},$$

where $F = 4r^2/(1-r^2)^2$, r is a reflection coefficient, Ng is an index of refraction of a medium existing in the cavity between the GRIN lenses, Lg is a length of the cavity between the GRIN lenses, and w is an optical wavelength of the input signal.

19. An optical arrangement comprising:
    an optical filter responsive to an input signal for generating at an output thereof one of a group consisting of a periodic and aperiodic output response waveform having a rounded passband shape; and
    an optical flattening filter coupled in cascade with the optical filter between an input and an output of the optical arrangement for generating a response waveform having a spectral profile which is complementary to the periodic or aperiodic output response waveform of the optical filter and interacts with the response waveform of the optical filter such that each peak in a resultant response waveform at the output of the optical arrangement is substantially flattened to provide a passband which is wider than the response waveform provided by the optical filter, wherein the flattening filter generates a response waveform that has a spectral profile which is complementary to, and has a periodicity equal to, the response waveform of the optical filter; and the optical arrangement further comprises at least a second optical flattening filter wherein the second flattening filter generates a response waveform that has a spectral profile which has a periodicity which is an integer multiple of the response waveform of the optical filter, wherein the optical flattening filter and the at least second optical flattening filter have different periodicities to achieve flattening using a Fourier series of waveforms.

20. A method of generating a wide flat passband at an output of an optical arrangement comprising the steps of:

(a) generating, in response to an input signal to an optical filter, one of a group consisting of a periodic output response waveform and aperiodic output response waveform having a rounded passband shape;

(b) generating a response waveform having a spectral profile which is complementary to the periodic or aperiodic output response waveform of the optical filter in an optical flattening filter coupled in cascade with the optical filter between an input and the output of the optical arrangement; and (c) generating a passband which is wider than the response waveform provided by the optical filter at the output of the optical arrangement by the interaction of the response waveforms of the optical filter obtained in step (a) and the optical flattening filter obtained in step (b) such that each peak in a resultant response waveform at the output of the optical arrangement is substantially flattened, (d) in performing step (b), generating a response waveform that has a spectral profile which is complementary to, and has a periodicity equal to, the response waveform of the optical filter in the flattening filter; and (e) prior to performing step (c), generating a response waveform that has spectral profile which has a periodicity which is an interger multiple of the response waveform of the optical filter in at least a second optical flattening filter, wherein the optical flattening filter and the at least second optical flattening filter have different periodicities to achieve flattening using a Fourier series of waveforms.

21. An optical arrangement comprising:

an optical multiplexer/demultiplexer responsive to an input signal for generating at an output thereof one of a group consisting of a periodic and aperiodic output response waveform having a rounded passband shape; and an optical flattening filter coupled in cascade with the optical multiplexer/demultiplexer between an input and an output of the optical arrangement for generating a response waveform having a spectral profile which is complementary to the periodic or aperiodic output response waveform of the optical multiplexer/demultiplexer and interacts with the response waveform of the optical multiplexer/demultiplexer such that each peak in a resultant response waveform at the output of the optical arrangement is substantially flattened to provide a passband which is wider than the response waveform provided by the optical multiplexer/demultiplexer, wherein the optical flattening filter comprises one of a Mach-Zehnder type of filter and a Fabry-Perot type of filter.

22. A method of generating a wide flat passband at an output of an optical arrangement comprising the steps of:

(a) generating, in response to an input signal to an optical multiplexer/demultiplexer, one of a group consisting of a periodic output response waveform and aperiodic output response waveform having a rounded passband shape;

(b) generating a response waveform having a spectral profile which is complementary to the periodic or aperiodic output response waveform of the optical multiplexer/demultiplexer in an optical flattening filter coupled in cascade with the optical multiplexer/demultiplexer between an input and the output of the optical arrangement; and (c) generating a passband which is wider than the response waveform provided by the optical multiplexer/demultiplexer at the output of the optical arrangement by the interaction of the response waveforms of the optical multiplexer/demultiplexer obtained in step (a) and of the optical flattening filter obtained in step (b) such that each peak in a resultant response waveform at the output of the optical arrangement is substantially flattened, wherein the optical flattening filter comprises one of a Mach-Zehnder type of filter and a Fabry-Perot type of filter.

* * * * *